US008810435B2

(12) United States Patent
He

(10) Patent No.: US 8,810,435 B2
(45) Date of Patent: Aug. 19, 2014

(54) APPARATUS AND METHOD FOR DISPLAYING A HELICOPTER APPROACH TO AN AIRPORT LANDING PAD

(75) Inventor: Gang He, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 154 days.

(21) Appl. No.: 13/536,076

(22) Filed: Jun. 28, 2012

(65) Prior Publication Data
US 2014/0002280 A1  Jan. 2, 2014

(51) Int. Cl.
G08B 21/00 (2006.01)
G05D 1/12 (2006.01)
G05D 1/10 (2006.01)

(52) U.S. Cl.
CPC . G05D 1/12 (2013.01); G05D 1/102 (2013.01)
USPC .......................................... 340/946; 340/973

(58) Field of Classification Search
CPC ....... G05D 1/12; G05D 1/102; G05D 1/0858; G08G 5/0021
USPC ............... 340/946, 973–976; 73/178; 701/14; 244/17.11
See application file for complete search history.

(56) References Cited

U.S. PATENT DOCUMENTS

| | | | |
|---|---|---|---|
| 5,677,685 A | 10/1997 | Coirier et al. | |
| 6,157,876 A | 12/2000 | Tarleton, Jr. et al. | |
| 6,185,486 B1 | 2/2001 | Labounsky et al. | |
| 6,255,965 B1 * | 7/2001 | D'Orso | 340/946 |
| 6,972,696 B2 * | 12/2005 | Rogers et al. | 340/973 |
| 7,106,217 B2 | 9/2006 | Judge et al. | |
| 7,295,901 B1 | 11/2007 | Little et al. | |
| 7,346,437 B2 | 3/2008 | Petillon | |
| 7,365,652 B2 * | 4/2008 | Scherbarth | 340/974 |
| 7,373,242 B2 | 5/2008 | Yamane | |
| 7,672,758 B2 | 3/2010 | Astruc | |
| 8,019,490 B2 | 9/2011 | Ferren et al. | |
| 8,140,260 B2 | 3/2012 | Feyereisen et al. | |
| 8,155,806 B2 * | 4/2012 | Suddreth et al. | 701/14 |
| 8,339,284 B2 * | 12/2012 | He | 340/946 |
| 2008/0262664 A1 | 10/2008 | Schnell et al. | |
| 2008/0319592 A1 | 12/2008 | Colclough | |
| 2010/0036552 A1 | 2/2010 | Pepitone et al. | |
| 2010/0113149 A1 | 5/2010 | Suddreth et al. | |
| 2010/0156758 A1 | 6/2010 | Anders | |
| 2010/0231705 A1 | 9/2010 | Yahav et al. | |

* cited by examiner

Primary Examiner — John A Tweel, Jr.
(74) Attorney, Agent, or Firm — Ingrassia Fisher & Lorenz, P.C.

(57) ABSTRACT

A system and method, that will allow helicopter pilots to air taxi from an instrument approach to an airport to a designated landing area or pad, includes symbology characterizing an approach aim point different from an aim point for aircraft landing on the runway, and symbology indicating an air taxi route from the approach aim point to a landing pad.

20 Claims, 5 Drawing Sheets

APPARATUS AND METHOD FOR DISPLAYING A HELICOPTER APPROACH TO AN AIRPORT LANDING PAD

TECHNICAL FIELD

The exemplary embodiments described herein generally relates to helicopter aviation and more particularly to helicopter approaches to an airport.

BACKGROUND

The approach to landing and landing at a large airport by a helicopter is probably one of the most challenging tasks a helicopter pilot undertakes during normal operations due to the precision actions required and increased pilot workload. To perform the landing properly, the helicopter approaches a landing pad at an airport, after executing instrument approach procedures to a ATC designated target such as at or near a runway threshold, by performing an air taxi maneuver. Air taxiing is the flying of the helicopter along, and at very low altitude above the airport terrain. While air taxiing, a pilot must fly a route per clearance and avoid obstacles such as parked or taxiing aircraft and buildings and in what may be limited visibility due to weather, lack of sunlight, or positioning of the sun. In a large airport environment, the actual helicopter landing pad may be a significant distance away from the instrument approach point and may not be visible due to distance or obstructions even in day time VMC operations.

When pilots air taxi in visual meteorological conditions, it is often difficult to judge the air taxi route in three dimension space to properly arrive at the landing pad. This is more of an issue in limited visibility when the landing pad is not in sight. Given the trend of tighter path management for increased safety within terminal airspace, and congested airport environment, it is desirable to provide an intuitive pathway display that is compatible with helicopter parameters.

This is especially true when transiting to visual flight at the end of an instrument approach procedure to the airport. While flying the instrument approach, pilots are trained to monitor progress and make adjustment with reference to the flight instruments, e.g., the Flight Director (FD), the glideslope deviation scale, and the Horizontal Situation Indicator (HSI). These standard flight instruments have been designed to provide guidance cues in an accurate and unambiguous manner. During the visual segment of an instrument approach, the crew transitions from the instrument scan to visual cues in the outside environment. This transition requires the pilot to change from the abstraction of the schematic flight instruments to real world analog visual cues. These visual cues include: the apparent shape and size of the runway, the spacing and size of runway markings, and the apparent relative motion of the helicopter along the ground. An abrupt transition from instruments to visual can be disorienting.

Accordingly, it is desirable to provide a display system and method for assisting a helicopter pilot in performing an air taxi approach to a landing pad after performing an instrument approach to an airport. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

A display system and method are provided for assisting a helicopter pilot in performing an air taxi approach to a landing pad after performing an instrument approach to an airport.

A first exemplary embodiment comprises a method of providing visual guidance from an instrument approach to a landing pad at an airport for an aircrew of a helicopter, comprising displaying an aim point for the helicopter during the instrument approach; and displaying an air taxi path from the aim point to the landing pad.

A second exemplary embodiment comprises a method of providing visual guidance from an instrument approach to a landing pad at an airport for an aircrew of a helicopter, comprising displaying first symbology for the instrument approach including an aircraft aim point; displaying second symbology including a helicopter aim point; and displaying an air taxi path from the helicopter aim point to the landing pad.

A third exemplary embodiment comprises display system comprising a display; a database; an avionics system; a processor coupled to the display, database, and avionics system, the processor configured to display first symbology for the instrument approach including an aircraft aim point; display second symbology including a helicopter aim point; and display an air taxi path from the helicopter aim point to the landing pad.

BRIEF DESCRIPTION OF THE DRAWINGS

The present invention will hereinafter be described in conjunction with the following drawing figures, wherein like numerals denote like elements.

DETAILED DESCRIPTION

Figure 1:
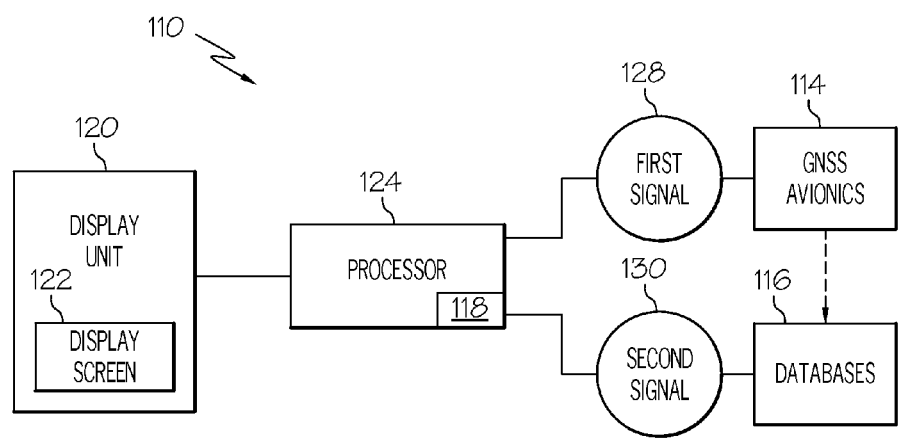
FIG. 1 is a known block diagram of a vehicle display system for generating images in accordance with exemplary embodiments.

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

A system and method, that will allow helicopter pilots to air taxi from an instrument approach to an airport to a designated landing area or pad, includes symbology characterizing an approach aim point different from an aim point for aircraft landing on the runway, and symbology indicating an air taxi route from the approach aim point to a landing pad. Optionally, additional symbology may be provided to highlight the landing pad and symbology may be provided indicating air taxi operations may be commenced.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), vector processor, stream processor, specialized graphical processor used for general computations (GPGPU), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments. Any of the above devices are exemplary, non-limiting examples of a computer readable storage medium.

The steps of a method or algorithm described in connection with the embodiments disclosed herein may be embodied directly in hardware, in a software module executed by a processor, or in a combination of the two. A software module may reside in RAM memory, video memory (VRAM, DRAM), video card memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Any of the above devices are exemplary, non-limiting examples of a computer readable storage medium.

For the sake of brevity, conventional techniques related to graphics and image processing, navigation, flight planning, helicopter controls, helicopter data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

The following detailed description is merely exemplary in nature and is not intended to limit application and uses. Furthermore, there is no intention to be bound by any theory presented in the preceding background or the following detailed description.

FIG. 1 is a simplified functional block diagram illustrating a display system 110 for displaying images to a pilot of a helicopter landing environment. System 110 includes multiple components each of which may be configured for mounting to a helicopter. In some embodiments, system 110 may be a self-contained system such that each of the components described below are contained in a single housing and are dedicated exclusively to serving the functions of system 110, while in other embodiments, the various components described below may be standalone components or they may be components that are used as part of other systems and which are configured to be used as a shared resource between such other systems and system 110.

In the embodiment illustrated in FIG. 1, system 110 includes Global Navigation Satellite System (GNSS) and avionics sensors 114, databases 116, a display unit 120, a display screen 122, and a processor 124 including memory 118. The databases 116 include a synthetic vision system (SVS) and a terrain and runway database. In equivalent embodiments, system 110 may include either additional or fewer components.

In some embodiments, the system 110 may operate fully or partially integrated into an enhanced vision system (not shown), or a combined vision system (not shown) when the enhanced vision system is used together with the SVS, terrain database, and the runway database.

When used, the databases 116 include a symbol database, where synthetic symbols assigned to various airport features, for example, terrain, are stored. In some embodiments this can be stored just in the memory 118 of the processor 124. In other embodiments, an external database might be used. Typically, the databases 116 would include; for example, a navigation database where runway locations would be stored, and a runway database which may include, for example, information about runway heading and width. In accordance with the exemplary embodiments described herein, symbology is stored providing guidance to the helicopter pilot for transitioning from an instrument approach to a helicopter aim point and along an air taxi path to a landing pad.

The memory 118 may be realized as RAM memory, flash memory, EPROM memory, EEPROM memory, registers, a hard disk, a removable disk, a CD-ROM, or any other form of storage medium known in the art. In this regard, the memory 118 can be coupled to the processor 124 such that the processor 124 can be read information from, and write information to, the memory 118. In the alternative, the memory 118 may be integral to the processor 124. As an example, the processor 124 and the memory 118 may reside in an ASIC. In practice, a functional or logical module/component of the display system 110 might be realized using program code that is maintained in the memory 118. Moreover, the memory 118 can be used to store data utilized to support the operation of the display system 110, as will become apparent from the following description.

The display system 110 of the exemplary embodiment includes a position determining unit 114 that is configured to determine the position of the helicopter with respect to the surface of the earth. Such a position determining unit may include, for example but not limited to, a GNSS system or an inertial navigation system. The position determining unit 114 further includes Avionics configured to receive course, speed and other inputs relating to the helicopter's heading, altitude and attitude and is provided to the processor 124 as a first signal 128. Geographic position data (high integrity) may be determined by a combination of a GPS (with or without wide area augmentation system) and an inertial reference system (not shown).

The display system 110 uses the databases 116 to generate a three-dimensional image of the topographical environment of the approach to an airport (referred to hereinafter as "synthetic image") and generate a second signal 130 carrying the image and to provide the second signal 130 to processor 124. The databases 116 may include data relating to the topography environment, which may represent either or both landscape and/or man-made structures located along the helicopter's flight path. In some embodiments, the databases 116 may contain such data for an entire geographical region such as a state, a country or continent. The databases may also contain airport specific data such as position, orientation of taxiways, buildings and obstructions with an airport environment, normal or often used air-taxi route, control towers, etc.

In some embodiments, the databases 116 may include a dedicated processor, microprocessor, or other circuitry that is configured to take the information pertaining to the position, attitude, altitude and heading of the helicopter and to utilize the information available in the database to generate the second signal 130 that may be utilized by processor 124 to render a three-dimensional image of the topographical environment for a runway as well as its surrounding environment to which the helicopter is approaching. In other embodiments, the databases 116 may not include a dedicated processor, microprocessor or other circuitry. In such embodiments, the second signal 130 would include the unprocessed sensor information and location data which could then be utilized by processor 124 to render a three dimensional image. In either event, the databases 116 is configured to provide second signal 130 to processor 124.

In accordance with the exemplary embodiments, the databases 116 stores approach objects for the desired runway for the approach, as well as a plurality of other approach objects for each of a plurality of runways for which the helicopter may perform an approach for landing. Approach objects are symbology added to the display. For example, the approach objects may be two or three dimensional objects that provide a graphic image.

The display 120 is configured to provide the enhanced images to the operator. In accordance with an exemplary embodiment, the display 120 may be implemented using any one of numerous known displays suitable for rendering textual, graphic, and/or iconic information in a format viewable by the operator. Non-limiting examples of such displays include various cathode ray tube (CRT) displays, and various flat panel displays such as various types of LCD (liquid crystal display) and TFT (thin film transistor) displays. The display 120 additionally may be implemented as a panel mounted display, a HUD (head-up display) projection, or any one of numerous known technologies. It is additionally noted that the display 120 may be configured as any one of numerous types of helicopter flight deck displays. For example, it may be configured as a multi-function display, a horizontal situation indicator, or a vertical situation indicator. In the depicted embodiment, however, the display 120 is configured as a primary flight display (PFD).

Additionally, display unit 120 includes a display screen 122 that is operatively connected to display unit 120. Display screen 122 is configured to be controlled by display unit 120 and may be used to display any type of image including, but not limited to, graphics and text. In some embodiments, display unit 120 may include multiple display screens 122 and/or system 110 may include multiple display units 120.

Processor 124 may be any type of computer, computer system, microprocessor, collection of logic devices, or any other analog or digital circuitry that is configured to calculate, and/or to perform algorithms, and/or to execute software applications, and/or to execute sub-routines, and/or to be loaded with and to execute any type of computer program. Processor 124 may comprise a single processor or a plurality of processors acting in concert. In some embodiments, processor 124 may be dedicated for use exclusively with system 110 while in other embodiments processor 124 may be shared with other systems on board the helicopter. In still other embodiments, processor 124 may be integrated into any of the other components of system 110.

Processor 124 is communicatively coupled to the GNSS/avionics sensors 114 and databases 116, and is operatively coupled to display unit 120. Such communicative and operative connections may be effected through the use of any suitable means of transmission, including both wired and wireless connections. For example, each component may be physically connected to processor 124 via a coaxial cable or via any other type of wired connection effective to convey electronic signals. In other embodiments, each component may be communicatively connected to processor 124 across a bus or other similar communication corridor. Examples of suitable wireless connections include, but are not limited to, a Bluetooth connection, a Wi-Fi connection, an infrared connection, OneWireless™ connection, or the like. The OneWireless™ connection has been developed by Honeywell International, Inc., the Assignee of this document.

Being communicatively and/or operatively coupled with the GNSS/avionics sensors 114, databases 116, and display unit 120 provide processor 124 with a pathway for the receipt and transmission of signals, commands, instructions, and interrogations to and from each of the other components.

Processor 124 is configured (i.e., loaded with and being capable of executing suitable computer code, software and/or applications) to interact with and to coordinate with each of the other components of system 110 for the purpose of overlaying images corresponding to the second signal 130. For example, in the illustrated embodiment, the processor 124 is configured to receive a second signal 130 from the databases 116 and to send a command to the display unit 120 instructing the display unit 120 to display portions of a corresponding image generated from database or symbols, on a display screen 122. The processor 124 may also be configured to receive a first signal 128 from the helicopter's GNSS/Avionics system 114 to aid displaying data in an iconic format.

In operation, the processor 120 is configured to process data obtained from the GNSS and avionics 114 of flight status data for the host helicopter. In this regard, the sources of flight status data generate, measure, and/or provide different types of data related to the operational status of the host helicopter, the environment in which the host helicopter is operating, flight parameters, and the like. In practice, the sources of flight status data may be realized using line replaceable units (LRUs), transducers, accelerometers, instruments, sensors, and other well known devices. The data provided by the sources of flight status data may include, for example and without limitation: airspeed data; groundspeed data; altitude data; attitude data, including pitch data and roll data; yaw data; geographic position data (high integrity), such as a combination of GPS (wide area augmentation system) and inertial reference system data; time/date information; heading information; weather information; flight path data; track data; radar altitude data; geometric altitude data; wind speed data; and wind direction data.

Figure 2:
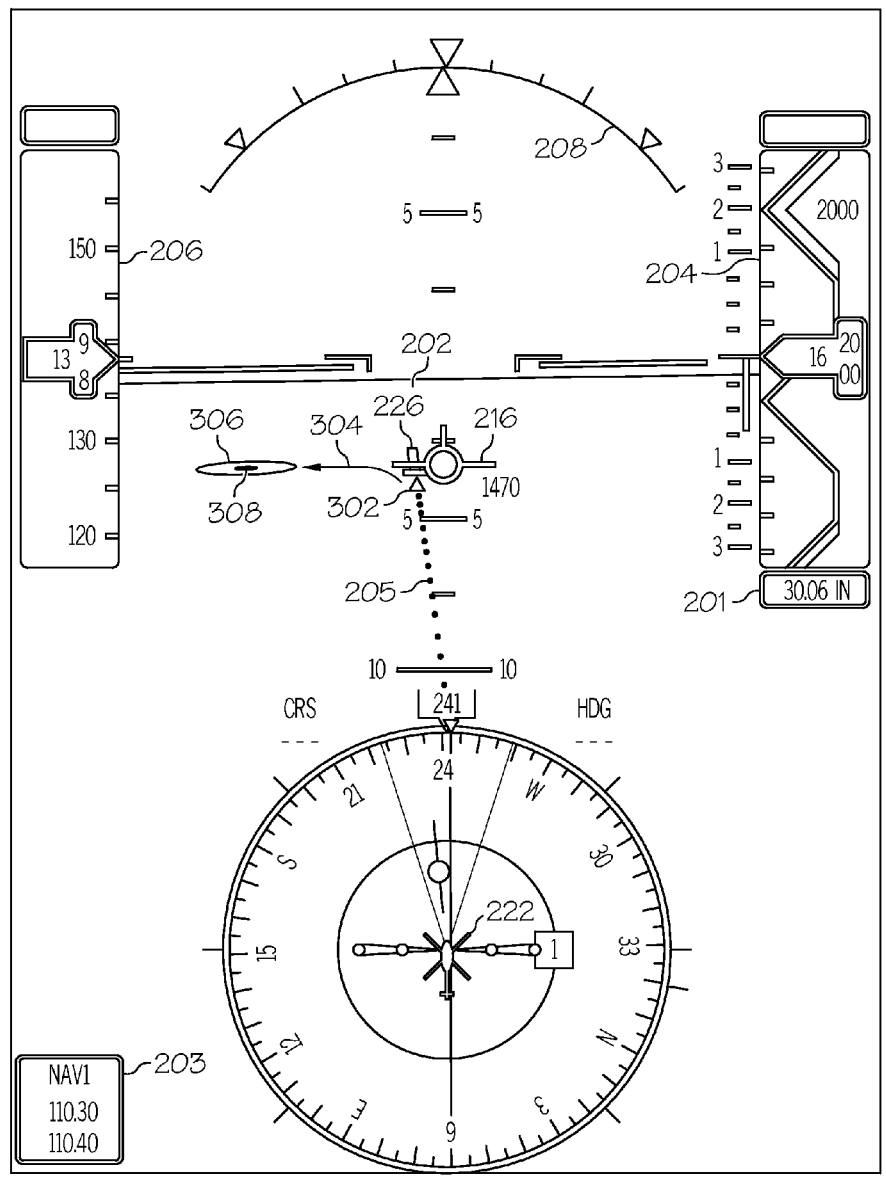
FIG. 2 is a simulated image of a landing environment in accordance with an exemplary embodiment.

Referring to FIG. 2, textual, graphical, and/or iconic information rendered by the display unit 120, in response to appropriate display commands from the processor 124 is depicted. It is seen that the display unit 120 renders a view of the terrain 202 ahead of the aircraft, preferably as a three-dimensional perspective view, an altitude indicator 204, an airspeed indicator 206, an attitude indicator 208, and a flight path vector indicator 216. Additional information (not shown) is typically provided in either graphic or numerical format representative, for example, of altimeter setting 201, navigation receiver frequencies 203, and symbology 205 assisting the pilot in performing an instrument approach.

A helicopter icon 222 is representative of the current heading direction relative to the specific runway 226 on which the helicopter is to land. The desired helicopter direction is determined, for example, by the processor 124 using data from the navigation database 116 and the avionics 114. It will be appreciated, however, that the desired helicopter direction may be determined by one or more other systems or subsystems, and from data or signals supplied from any one of numerous other systems or subsystems within, or external to, the helicopter. Regardless of the particular manner in which the desired helicopter direction is determined, the processor 124 supplies appropriate display commands to cause the display unit 120 to render the helicopter icon 222.

The flight path marker 216 is typically a circle with horizontal lines (representing wings) extending on both sides therefrom, a vertical line (representing a rudder) extending upwards therefrom, and indicates where the plane is "aimed". One known enhancement is, when the flight path marker 216 blocks the view of another symbol on the screen 122, the portion of the flight path marker 216 that is blocking the other symbol becomes transparent.

Figure 3:
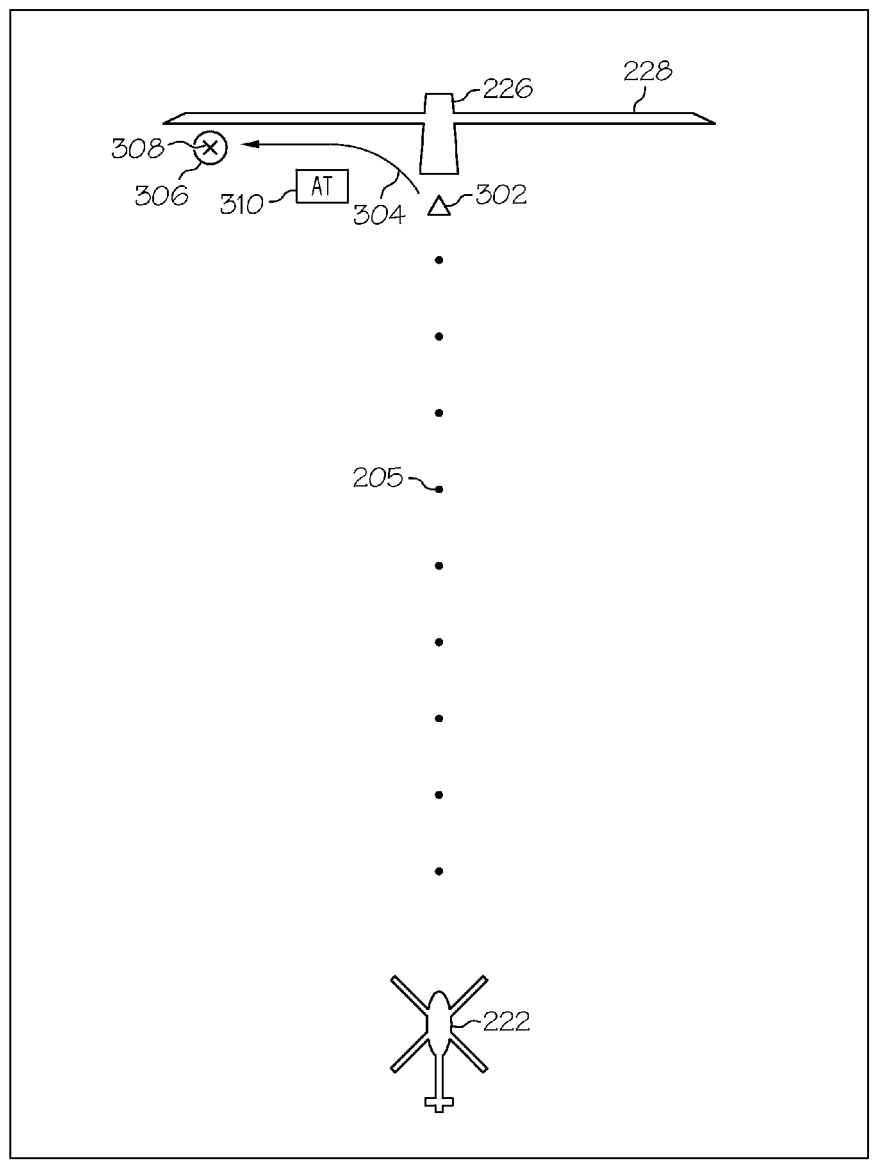
FIG. 3 is a simulated image of a landing environment in accordance with another exemplary embodiment.
Figure 4:
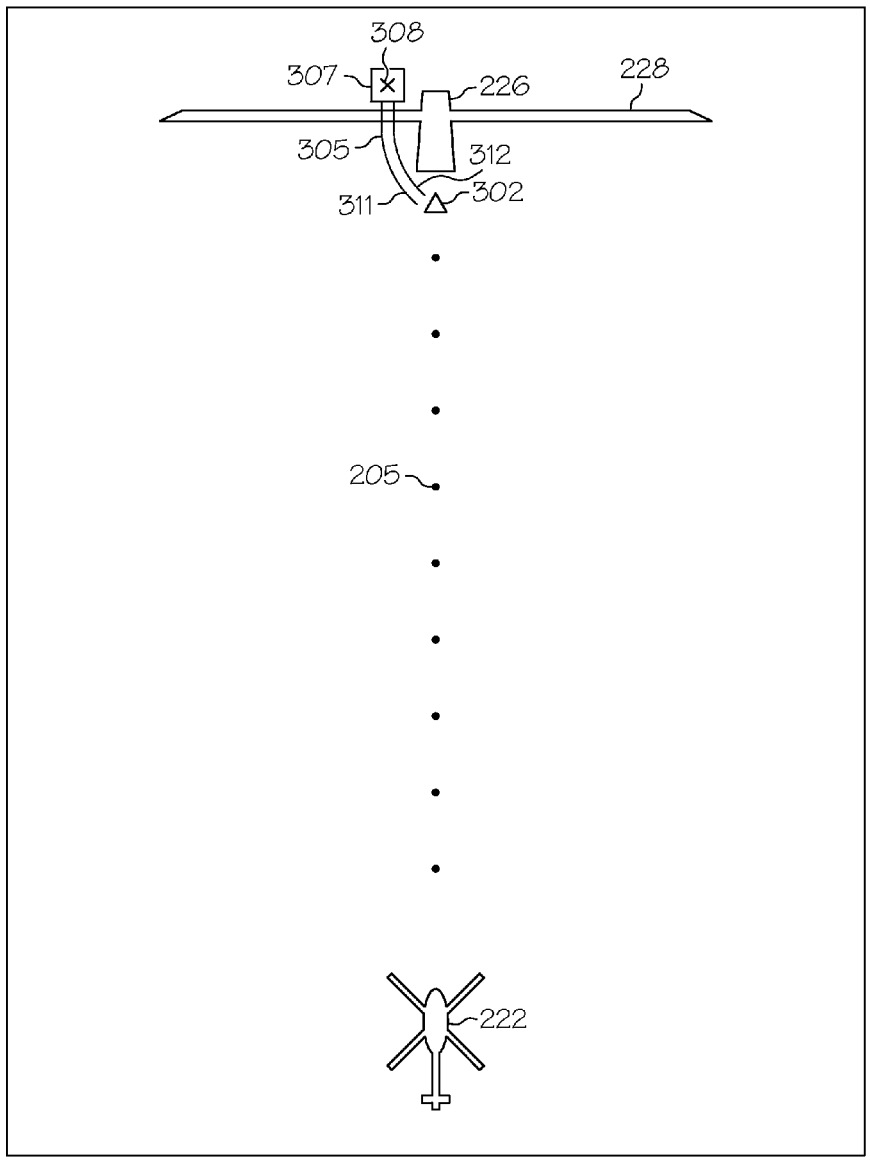
FIG. 4 is a simulated image of a landing environment in accordance with yet another exemplary embodiment.

In accordance with an exemplary embodiment, and referring to both FIG. 2 and the simpler view of FIG. 3, a helicopter aim point 302 or instrument approach point and an air taxi path 304 are provided. The aim point 302 is specifically for helicopter operations and is different from an airplane aim point or touch down point (not shown) that conventionally is on the runway 226 typically some distance down the runway from the threshold point. The helicopter aim point may be adjacent the approach end of the runway 226 and may be of any format, but preferably of a format specific to helicopter operations. Optionally, symbology 306 may highlight a landing pad 308 for the helicopter 222, and additional symbology 310 may be provided to indicate that the helicopter is cleared by ground control to fly the air taxi path. The air taxi path can be displayed based on given clearances. For example, if the clearance is to follow a certain taxiway path 304, the taxi path 304 is to be displayed along the pavement. If the clearance is to go directly from the instrument approach point 302 to the landing pad 308, the taxi path 304 is shown as a straight line. If the clearance is such that certain turns and area avoidance are required, the path 304 can be shown as alternating sections of straight lines and curves, or alternatively as curved line, for example, curves 311, 312 of path 305 (FIG. 4), connecting the instrument approach point 302 to the landing pad 308 as indicated by the symbol 307. The air taxi path 304, 305 is displayed on the terrain 202, tracing or conforming to ground profile and objects on terrain. As the air taxi is performed at very low altitude, the terrain conforming format provide the effective path information while reducing the display clutter.

Figure 5:
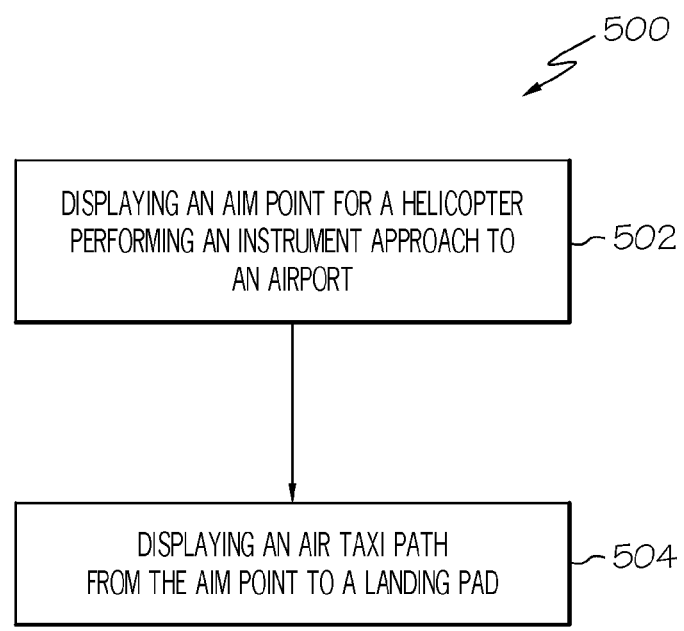
FIG. 5 is a flow chart of a method in accordance with an exemplary embodiment.

FIG. 5 is a flow chart that illustrates an exemplary embodiment of a display process 500 suitable for use with a flight deck display system such as the display system 110. Process 500 represents one implementation of a method for displaying helicopter traffic information on an onboard display element of a host helicopter. The various tasks performed in connection with process 500 may be performed by software, hardware, firmware, or any combination thereof. For illustrative purposes, the following description of process 500 may refer to elements mentioned above in connection with FIG. 5. In practice, portions of process 500 may be performed by different elements of the described system, e.g., a processor, a display element, or a data communication component. It should be appreciated that process 500 may include any number of additional or alternative tasks, the tasks shown in FIG. 5 need not be performed in the illustrated order, and process 500 may be incorporated into a more comprehensive procedure or process having additional functionality not described in detail herein. Moreover, one or more of the tasks shown in FIG. 5 could be omitted from an embodiment of the process 500 as long as the intended overall functionality remains intact.

In accordance with the exemplary embodiment of FIG. 5, an aim point for a helicopter performing an instrument approach to an airport is displayed 502, and an air taxi path from the aim point to a landing pad is displayed 504. The displayed air taxi path may comprise, for example, a line or a path having width, and may further comprise a symbol such as an arrow indicating the direction the helicopter would fly to reach the landing pad. Additionally, the landing pad may comprise symbology highlighting the displayed landing pad.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method of providing visual guidance from an instrument approach to a landing pad at an airport for an aircrew of a helicopter, comprising:
    displaying an aim point for the helicopter during the instrument approach; and
    displaying an air taxi path from the aim point to the landing pad.

2. The method of claim 1 further comprising:
    displaying symbology highlighting the landing pad.

3. The method of claim 1 wherein displaying the air taxi path comprises:
    displaying at least one of a straight line and a curved line.

4. The method of claim 1 wherein displaying the air taxi path comprises:
    displaying two opposed borders outlining the air taxi path.

5. The method of claim 1 wherein displaying the aim point and the air taxi path comprise:
    displaying a format unique to helicopter operations.

6. The method of claim 1 further comprising:
    displaying symbology indicating the helicopter may commence flying in the air taxi path.

7. The method of claim 1 where the taxi path conforms to the terrain.

8. The method of claim 1 wherein the taxi path conforms to objects in the taxi path.

9. A method of providing visual guidance from an instrument approach to a landing pad at an airport for an aircrew of a helicopter, comprising:
    displaying first symbology for the instrument approach including an aircraft aim point;
    displaying second symbology including a helicopter aim point; and
    displaying an air taxi path from the helicopter aim point to the landing pad.

10. The method of claim 9 further comprising:
    displaying symbology highlighting the landing pad.

11. The method of claim 9 wherein displaying the air taxi path comprises:
    displaying one of a straight or a curved line.

12. The method of claim 9 wherein displaying the air taxi path comprises:
    displaying two opposed borders outlining the air taxi path.

13. The method of claim 9 wherein displaying the aim point and the air taxi path comprise:
    displaying a format unique to helicopter operations.

14. The method of claim 9 further comprising:
    displaying symbology indicating the helicopter may commence flying in the air taxi path.

15. A display system comprising:
    a display;
    a database;
    an avionics system;
    a processor coupled to the display, database, and avionics system, the processor configured to:
        display first symbology for the instrument approach including an aircraft aim point;
        display second symbology including a helicopter aim point; and
        display an air taxi path from the helicopter aim point to the landing pad.

16. The display system of claim 15 wherein the processor is further configured to:
    display symbology highlighting the landing pad.

17. The display system of claim 15 wherein the processor is further configured to:
    display the air taxi path as one of a straight or a curved line.

18. The display system of claim 15 wherein the processor is further configured to:
    display the air taxi path having two opposed borders outlining the air taxi path.

19. The display system of claim 15 wherein the processor is further configured to:
    display the aim point and the air taxi path in a format unique to helicopter operations.

20. The display system of claim 15 wherein the processor is further configured to:
    display symbology indicating the helicopter may commence flying in the air taxi path.

* * * * *